3,412,310
POWER SUPPLY FOR GLOW DISCHARGE TYPE VACUUM PUMPS EMPLOYING A VOLTAGE-DOUBLER BRIDGE-RECTIFIER AND A SOFT TRANSFORMER
Dale L. Quinn, Palo Alto, Calif., assignor to Varian Associates, Palo Alto, Calif., a corporation of California
Filed Mar. 6, 1967, Ser. No. 620,824
8 Claims. (Cl. 321—15)

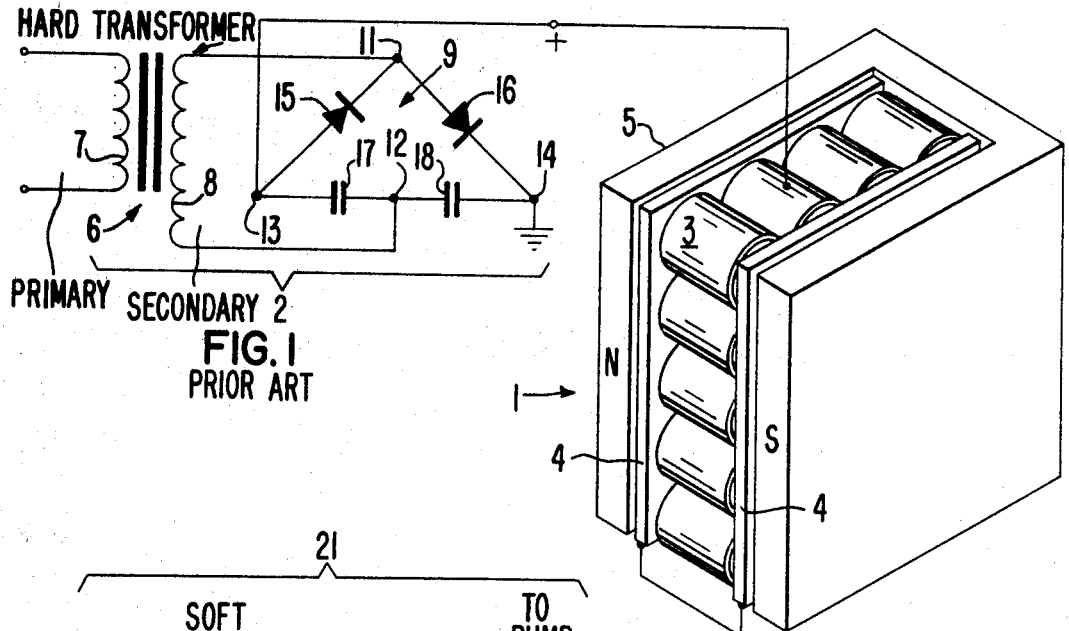
FIG. 1
PRIOR ART
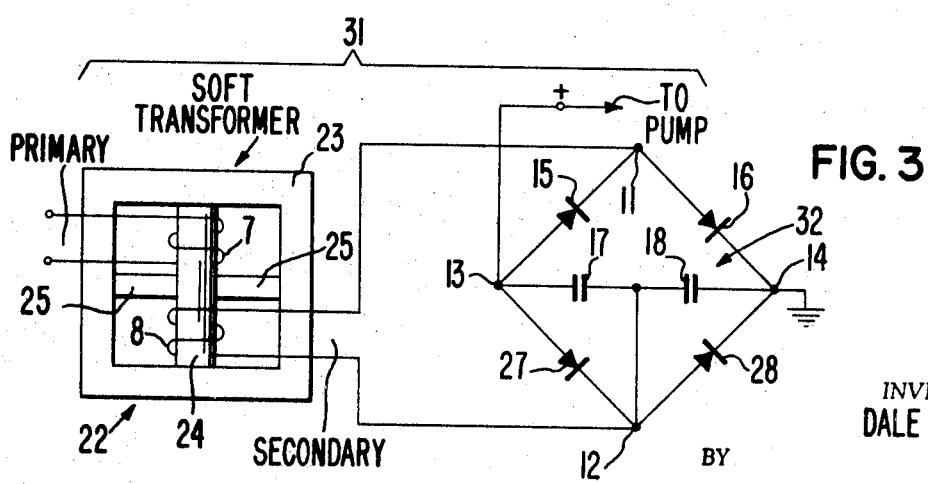
FIG. 2
PRIOR ART
FIG. 3
INVENTOR.
DALE L. QUINN
BY
Leon F. Herbert
ATTORNEY

United States Patent Office 3,412,310
Patented Nov. 19, 1968

ABSTRACT OF THE DISCLOSURE

There is disclosed a power supply for glow discharge type vacuum pumps which employs a voltage doubling full wave bridge rectifier supplied from a "soft" transformer. This power supply is especially useful for supplying power to a multiple cell getter ion vacuum pump. This type of pump employs a multiplicity of separate Penning type, magnetically confined, glow discharge columns which serve to ionize the gas and drive the ions into a getter material to sputter the getter material and to bury the ions, thus, pumping by gettering and burial. Glow discharge pumps in general, and Penning type pumps in particular, present a load to the power supply which is characterized by a low impedance, high current regime at high pressures, as of $10^{-3}$ torr, and a high impedance, low current regime at low pressures, as of $10^{-11}$ torr. The "soft" transformer together with the bridge rectifier provides a controlled and limited high current to the pump at high pressures and the voltage doubler provides the high voltage low current power to the pump in the low pressure regime. The voltage doubler portion of the power supply is provided by a pair of capacitors series connected in a circuit branch shunting the output terminals of the bridge rectifier. The series capacitors are centertapped to one of the input terminals of the bridge such that a capacitor is connected across each of the bridge diodes on one side of the bridge as divided by the output terminals.

Description of the prior art

Power supplies for glow discharge getter ion vacuum pumps have taken a number of different forms. In recent times, the power supplies have tended to be one of two types. In a first type, the supply used a "hard" transformer with a non-bridge type full wave rectifier and a capacitance voltage doubler circuit. The power supply was limited in its output current by the capacitive reactance of the voltage doubling capacitors which were in series with the secondary winding of the transformer. For high power, high current, pumps the current limiting capacitor became excessively large and expensive.

A second type of power supply used a full-wave bridge rectifier and a "soft" transformer. The current was limited by the "soft" transformer. As used herein "soft" means that the secondary of the transformer may be short circuited for prolonged periods without damaging the transformer. "Soft" transformers may also be referred to as high reactance or current limiting transformers. Such "soft" transformers typically employ a magnetic shunt around the secondary winding such that as the reactance builds up in the secondary more of the magnetic field of the primary is shunted around the secondary winding. While the bridge rectifier and "soft" transformer were capable of providing sufficient short circuit current for the high pressure regime the transformer became excessively expensive in order to provide both the high short circuit current and the high open circuit voltage for the low pressure regime. Also, when operating on standard line voltages of 220–240 v., the line current approached 30 amps. Any increase in output for improved starting performance of the pump would have resulted in greater than 30 amps of line current and due to the incrementing of commercial power equipment such as plugs and receptacles, this would have required the use of the next larger size which is a 50 amp rating and which is considerably larger and more costly.

Summary of the present invention

The principal object of the present invention is the provision of an improved power supply for glow discharge vacuum pumps.

One feature of the present invention is the provision of a voltage double circuit in a bridge rectifier, such bridge being supplied from a "soft" transformer, whereby the power supply operates with the pump as a current limited full-wave bridge rectifier in the high pressure regime and operates as a conventional fullwave rectifier and doubler in the low pressure regime.

Another feature of the present invention is the same as the preceding feature wherein the voltage double circuit includes capacitors connected across the output terminals of the power supply and in parallel with two diode arms of the bridge to bias the paralleled diode arms of the bridge to a non-conductive state when the impedance of the vacuum pump rises above a certain level indicative of a transition to a low pressure operating regime.

Another feature of the present invention is the same as the preceding feature wherein the capacitors are selected to have values of capacitance which are sufficiently high to shift the peak power output of the power supply, as supplied to the pump, toward the high pressure end of the high pressure regime, whereby stable operation is obtained over most of the operating range of the pump.

Other features and advantages of the present invention will become apparent upon a perusal of the following specification taken in connection with the accompanying drawings wherein:

Brief description of the drawings

FIG. 1 is a schematic diagram of a prior art glow discharge vacuum pump and power supply, FIG. 2 is a schematic diagram of an alternative prior art circuit to that shown in FIG. 1, FIG. 3 is a schematic circuit diagram of a glow discharge vacuum pump power supply of the present invention.

Description of the preferred embodiments

Figure 4:
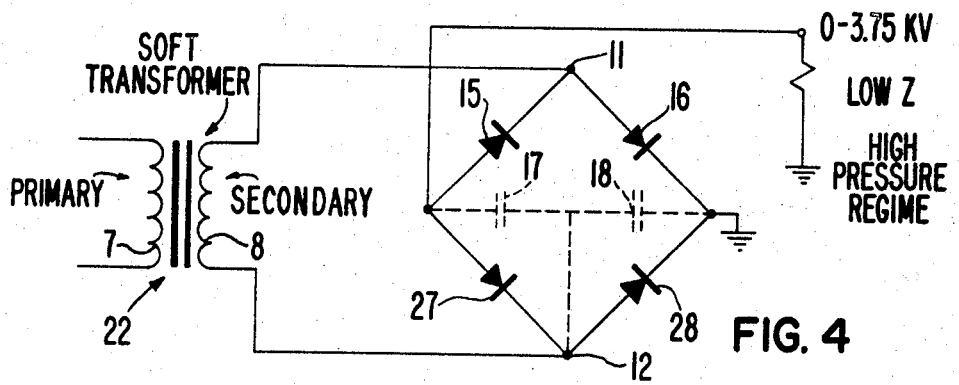
FIG. 4 is a schematic circuit diagram for the circuit of FIG. 3 depicting operation in the high pressure regime of the pump.

Referring now to FIG. 1, there is shown a prior art glow discharge vacuum pump 1 and its power supply circuit 2. The glow discharge vacuum pump 1 comprises an envelope, not shown, containing a multicellular anode 3 disposed between a pair of cathode plates 4. The cathode plates are made of a getter material such as titanium and the anode 3 is supported in spaced relation from the plates 4 by means of an insulator assembly, not shown. A magnet 5 is disposed externally of the vacuum envelope and produces a magnetic field as of 1000 gauss through the anode 3 and axially directed of the open ended anode cells.

The power supply 2 supplies a maximum positive voltage as of 7.5 kv. relative to the cathode plates 4, to the anode 3 below $10^{-9}$ Torr. When the gas pressure within the pump 1 is reduced by other vacuum pumping means, not shown, to about $10^{-3}$ Torr, the applied voltage causes a glow discharge to be established. The voltage between the anode 3 and the cathode 4 is now about 400 v. and the current is limited by power supply 2. This glow discharge is known as a Penning discharge and causes the gas to be ionized and the positive ions to be driven into the cathode plates 4 for sputtering of getter material and burial of the ions in the cathode plates 4. The sputtered material is collected on the surfaces within the pump and serves to getter gas coming in contact therewith, thereby pumping same. At pressure below about $3 \times 10^{-4}$ Torr, the glow discharge is characterized by a plurality of glow discharge columns, one confined within and being coaxial with each of the cells of the anode 3.

The power supply 2 comprises a hard transformer 6 having a primary winding 7 usually connected to a 120 v. 60 cycle power source. However, the transformer may be designed for a power source of 600 v. or less and 25 to 400 cycles. The secondary winding 8 of the transformer is connected to the input of a full wave voltage doubling rectifier circuit 9.

The voltage doubling rectifier circuit 9 includes a pair of input terminals 11 and 12 and a pair of output terminals 13 and 14. Two rectifying arms 15 and 16 are provided. One arm 15 is connected between one input terminal 11 and one output terminal 13 and the other arm 16 is connected between the one input terminal 11 and the other output terminal 14. A pair of capacitors 17 and 18 are connected in series across the output terminals 13 and 14. The series connection of capacitors 17 and 18 is center tapped to form the other input terminal 12 of the rectifier 9.

The glow discharge within the pump 1 is characterized by two operating regimes. One of these regimes is a high pressure pumping and starting regime wherein the discharge is characterized by an extremely low impedance. Thus, in this regime, current must be limited to the pump in order to prevent burning up the pump, at worst, or overheating the pump and producing outgassing of its elements, thereby producing poor and unstable starting characteristics. In the circuit of FIG. 1, the current supplied in the high pressure regime is limited by the capacitive reactance of capacitors 17 and 18, as any output pulsating D.C. current must be drawn through capacitors 17 and 18. These capacitors become excessively expensive when relatively large starting currents as of 1 amp are desired for large pumps 1.

The other operating regime for the pump 1 is its low pressure regime, where low pressure is less than $10^{-5}$ Torr. In this regime the impedance of the pump increases to a very high value at less than $10^{-6}$ Torr.

The circuit of FIG. 1 economically provides the high voltage, as of 7.5 kv., at several milliamps or less for operation in the low pressure regime.

Referring now to FIG. 2, there is shown an alternative prior art power supply 21 for glow discharge pumps 1. In this case, the transformer 22 is a "soft" transformer in that the secondary winding 8 may be short circuited for prolonged periods without damaging the transformer 22. The line voltage applied to primary 7 is 220–240 v. The transformer 22 includes a closed magnetic yoke 23 with the primary and secondary windings 7 and 8 wound on a magnetic core member 24 of the yoke 23. A pair of magnetic shunt members 25 are connected between the core 24 and the yoke 23 at a point which intersects the core 24 between the windings 7 and 8. In this manner, as the current drawn from the secondary winding increases, the core flux density increases thereby shunting a greater percentage of the flux through the shunts 25 to the yoke 23. The shunts 25 are adjusted and dimensioned such that, when the secondary winding is short circuited, the short circuit current will be some value which the transformer can deliver for prolonged periods without damage. In a typical example, the secondary short-circuit current is adjusted for 1.33 amps RMS. The RMS secondary short circuit current is 1.11 times the D.C. output short circuit current.

The 5300 v. RMS output of the secondary winding 8 is connected across the input terminals 11 and 12 of a conventional four arm full wave bridge rectifier 26 having output terminals 13 and 14 and rectifying arms 15, 16, 27 and 28. The output terminals 13 and 14 are connected to the vacuum pump 1, as in FIG. 1.

One problem with the prior art power supply of FIG. 2 is that it has no voltage doubling feature. Thus, in order for the power supply to provide 7.5 kv. D.C. in the low pressure regime and produce the relatively high short circuit currents, as of 1.2 a. D.C., in the high pressure regime the transformer became relatively large and expensive.

Referring now to FIG. 3, there is shown the power supply 31 of the present invention. In this embodiment, the circuit 32 is essentially the same as that of FIG. 2 with the exception that the voltage doubling capacitor network of the circuit of FIG. 1 has been added. More specifically, capacitors 17 and 18 are connected in series across the output terminals 13 and 14 of the bridge rectifier 32. The series connected capacitors 17 and 18 are centertapped and connected to the input terminal 12 such that one of the capacitors 17 or 18 is connected in parallel with each of the rectifying arms 27 and 28.

Figure 5:
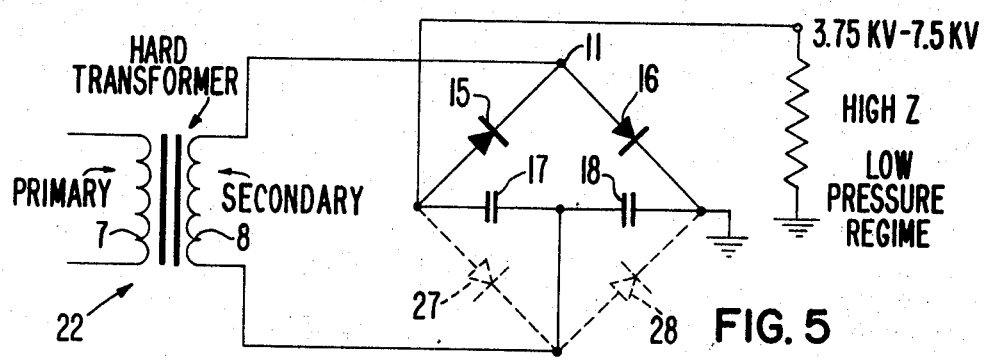
FIG. 5 is a schematic circuit diagram for the circuit of FIG. 3 depicting operation in the low pressure regime of the pump.

The values of capacitors 17 and 18 are selected such that, at low current operation in the low pressure regime, they have sufficient time constant with the load impedance to bias the diodes in the parallel connected arms 27 and 28 to a nonconductive state. In such a case, the circuit 32 in the low pressure regime operates like the voltage doubling circuit of FIG. 1, as depicted in FIG. 5. On the other hand, when the pump is operating in the high current, high pressure regime, the capacitors 17 and 18 taken together with the low impedance of the glow discharge vacuum pump have such a short time constant that the parallel connected diodes are fully conductive and the circuit operates like the full wave bridge rectifier of FIG. 2, as indicated by FIG. 4.

It is significant that the bridge doubler circuit of FIG. 3 can have the same D.C. short circuit current and open circuit voltage as the bridge circuit of FIG. 2 but with a 2650 v. RMS secondary voltage which is one-half the secondary voltage of the transformer in FIG. 2. Therefore, if the transformer secondary windings in FIG. 2 and FIG. 3 must supply equal short circuit current, the voltage ampere demand of the transformer in FIG. 2 will be twice that of the transformer in FIG. 3. For a primary voltage of 240 v., the line current to the transformer in FIG. 2 will be about 30 amps but in FIG. 3 the primary line current will be only 15 amps when the secondaries are shorted. The capacitance of capacitors 17 and 18 can be adjusted to give a D.C. output voltage versus current curve for the circuit 31 of FIG. 3 that closely follows the curve for the circuit 21 of FIG. 2. Reduction of line current by a factor of two is a considerable economic saving. Alternatively the D.C. output current of the circuit 31 in FIG. 3 could be increased up to twice that of the circuit 21 in FIG. 2 for faster ion pump starting speeds before a 30 amp line current is exceeded.

Figure 6:
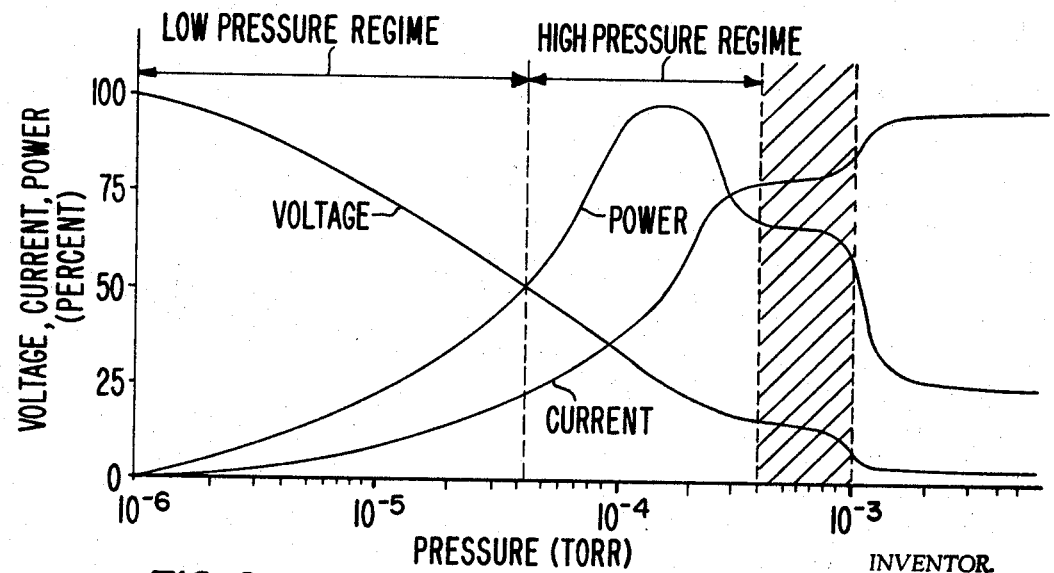
FIG. 6 is a plot of voltage, current, and power as a percent of maximum supplied to the pump by the circuit of FIG. 3 versus operating pressure in the pump.

Referring now to FIG. 6, there is shown a graph depicting the operating characteristics of a typical glow discharge pump and power supply of FIG. 3. In a typical example, the D.C. short circuit current is selected at 1.2 amps and this determines the transformer internal shunt design. The D.C. open circuit voltage of the supply is selected for 7.5 kv. and this establishes the turns ratio of the transformer and the peak reverse voltage rating for the diode rectifiers in the bridge 32. In a preferred embodiment, the rectifying arms 15, 16, 27 and 28 each include a series connection of at least ten 1000 PRV diodes to allow operation of each diode below their peak reverse voltage rating. The capacitors 17 and 18 were chosen to have a capacitance of 0.1 μf. and a voltage rating of 10 kv.

As seen from the graph of FIG. 6, the output voltage of the supply 31 decreases with increasing pressure, whereas, the current supplied increases with increasing pressure. The power supplied to the pump peaks-up well into the high pressure regime such that the pump will be operating over most of its operating range on the left side of the power peak. In this manner, if the pump encounters a gas burst, which momentarily increases the pressure inside the pump, the power supply will supply more power to pump out the gas burst. On the other hand, if the power supplied peaked up well into the low pressure regime and the pump were operating to the right of the power peak, such a gas burst would cause the power supply to deliver less power and as a result the pump might be swamped.

Although the power supply of FIG. 3 has been described as it is used with a multiple cell Penning type glow discharge vacuum pump, it is also applicable as a supply for other types of glow discharge vacuum pumps which have a low-impedance high-current, high pressure and a high-impedance low-current, low pressure operating regime.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a glow discharge type vacuum pump apparatus, means forming a pair of pump electrodes, means for applying an electrical potential across said pair of pump electrodes to establish a glow discharge and to pump gaseous material ionized by the glow discharge, means for supplying power to said pair of pump electrodes to sustain the glow discharge, said power supply means including, a soft transformer having a primary and secondary winding, a full wave bridge rectifier connected across said secondary winding of said soft transformer with the output power of said bridge rectifier being applied to sustain the glow discharge of the pump apparatus, the improvement comprising, means forming a voltage multiplying circuit connected into said bridge rectifier for increasing the output voltage of said bridge rectifier as compared to its input voltage as supplied to said bridge from said secondary winding of said soft transformer means.

2. The apparatus of claim 1 wherein said soft transformer means includes a magnetic shunt shunting a portion of the magnetic flux produced by said primary winding around said secondary winding.

3. The apparatus of claim 1 wherein said voltage multiplying circuit is a voltage doubling circuit.

4. The apparatus of claim 1 wherein said voltage multiplying circuit includes a pair of capacitors series connected across the output terminals of said bridge rectifier, and said capacitors also being connected with one capacitor in parallel with one rectifying arm of said bridge and the other one of said pair of capacitors being connected in parallel with a second rectifying arm of said bridge, whereby said capacitors control the conduction of current through said first and second rectifying arms of said bridge.

5. The apparatus of claim 4 wherein said bridge rectifier includes four rectifying arms, each of said rectifying arms including a diode rectifier, and wherein the capacitances of said pair of capacitors are of such values that at gas pressures within the pump apparatus of less than $10^{-5}$ Torr said diode rectifiers in said first and second arms are biased by the voltage across said capacitors to a non-conductive state, whereby said bridge functions as a voltage multiplying rectifier at pump pressures less than $10^{-5}$ Torr.

6. The apparatus of claim 4 wherein said bridge rectifier includes four rectifying arms, each of said rectifying arms including a diode rectifier, and wherein the capacitances of said capacitors are of such a value that at operating pressures within the pump apparatus higher than $10^{-4}$ Torr the voltage multiplying circuit is rendered inoperative such that said power supplying means has an output characteristic of a full wave bridge rectifier without a voltage multiplying circuit.

7. The apparatus of claim 6 wherein one of said pair of pump electrodes is a multicellular anode structure with said anode cells serving to define multiple glow discharge columns therein.

8. The apparatus of claim 7 wherein said capacitors have values of capacitance falling within the range of 0.01 and 1 microfarad.

References Cited

UNITED STATES PATENTS

| | | | |
|---|---|---|---|
| 2,822,535 | 2/1958 | Fields | 321—15 X |
| 3,275,922 | 9/1966 | Meyer et al. | 321—15 |

LEE T. HIX, *Primary Examiner.*

W. M. SHOOP, *Assistant Examiner.*